United States Patent [19]

Noack et al.

[11] 4,268,486
[45] May 19, 1981

[54] SELECTIVE CHROMATE REMOVAL FROM A CHLORATE SOLUTION

[75] Inventors: Manfred G. Noack, Northford; Steven A. Manke, Wallingford, both of Conn.

[73] Assignee: Olin Corporation, New Haven, Conn.

[21] Appl. No.: 54,333

[22] Filed: Jul. 2, 1979

[51] Int. Cl.³ .................... C01G 37/00; C07F 11/00
[52] U.S. Cl. ........................................ 423/55; 134/13; 210/721; 260/438.5 R
[58] Field of Search .................. 260/438.5 R; 134/13; 423/55

[56] References Cited

U.S. PATENT DOCUMENTS 3,537,896  11/1970  Nobse et al. ..................... 134/13

Primary Examiner—Helen M. S. Sneed
Attorney, Agent, or Firm—William D. Sabo

[57] ABSTRACT

A method has been devised for removing hexavalent chromium from concentrated aqueous alkali metal chlorate solutions by reacting the solution with a hydrazine compound and separating trivalent chromium compound from the solution. Alkali metal hypohalites may be simultaneously removed from the chlorate solution by reaction with excess hydrazine compound.

18 Claims, No Drawings

SELECTIVE CHROMATE REMOVAL FROM A CHLORATE SOLUTION

This invention relates to a process for removing hexavalent chromium from impure aqueous alkali metal chlorate solutions. More particularly, it relates to the removal of alkali metal dichromates from concentrated aqueous solutions of alkali metal chlorates by reacting said solutions with hydrazine compounds. Most particularly, the present invention relates to the removal of sodium dichromate from concentrated aqueous sodium chlorate solutions without significantly altering the ratio of sodium chlorate to sodium chloride in the strong oxidizing solution.

In the production of chlorine dioxide for use in the bleaching of chemical celluosic pulps, an aqueous solution of an alkali metal chlorate and an alkali metal chloride, particularly sodium chlorate and sodium chloride is reacted with a mineral acid, particularly sulfuric acid. In such a process, the aqueous solution contains the sodium chlorate and sodium chloride in a selected ratio which is conducive to optimum production of chlorine dioxide.

The aqueous solution of the sodium chlorate and sodium chloride is conventionally produced by the electrolysis of brine in electrolytic cells, usually bipolar electrolytic cells, the extent of the electrolysis suitably being controlled to produce an effluent from the cell in which the sodium chlorate and sodium chloride have essentially the selected ratio for optimum production of chlorine dioxide in the chlorine dioxide generator. The selected ratio of sodium chlorate to sodium chloride is in the range from about 1:1 to about 20:1 and preferably in the range from about 2:1 to about 10:1. However, in the electrolysis of the sodium chloride in the bipolar electrolytic cells to form sodium chlorate, it is conventional to add chromates to the electrolyte in the cell because the chromates significantly improve the current efficiency of the cells in the conversion of the sodium chloride to sodium chlorate. Chromate ion occurs in significant amounts in the cell effluent. It is desirable to remove chromate ion from the cell effluent before it is processed in the chlorine dioxide generator. Chromium is a valuable material; hence, it is desirable to recover it for reprocessing into chromate and subsequent re-use in the electrolytic cells. Further, if the chromate passes into the chlorine dioxide generator, it may be present in the waste effluent from the chlorine dioxide generator, and eventually reappear in the outside environment as a toxic pollutant.

U.S. Pat. No. 3,537,896, issued to Walter Nohse and Gunter Fischer on Nov. 3, 1970, describes a process for treating the carryover metal liquid (drag out) from a processing bath involving chromating and dichromating with a hydrazine chemical compound. The hydrazine is employed to react with dissolved hexavalent chromium and higher valent metal salt content of the drag out solvent and to precipitate resulting metal compounds from the processing solution. However, there is no teaching of the applicability of this process to a highly concentrated aqueous alkali metal chlorate solution, a strong oxidizing solution.

Other well-known methods of removing chromate ions from sodium chlorate solutions involve the batchwise chemical reduction of hexavalent chromium to trivalent chromium with chemical reducing agents such as zinc hydrosulfide, sodium sulfide, sodium bisulfide, potassium bisulfide, or hydrogen sulfide.

Peterson and Dexter describe, in U.S. Pat. No. 3,616,344, a process wherein an alkali metal chlorate solution used for electrochemical machining is treated with a ferrous salt or an alkali metal or ammonium sulfide, or a stannous salt to reduce hexavalent chromium in the chlorate solution to the trivalent state in which it precipitates from solution as hydrous chromic oxide. As an alternative procedure, Peterson et al mention the use of a soluble salt of divalent zinc, lead, cobalt, or copper as a reagent to effect removal of the chromate ions in the form of an insoluble chromate, from the solution.

The above-mentioned prior art processes for the removal of hexavalent chromium from aqueous solutions containing same are in general effective for the purpose intended, but they do have serious drawbacks. Not only pH control may be difficult, but also greater than stoichiometric quantities of the various chemical reagents may be required; and from a pollution standpoint, one toxic pollutant (chromate) may be replaced by another (such as the reducing agent itself). Further, the processed solution for the chlorine dioxide generator may end up alkaline and may have to be re-acidified for use in the chlorine dioxide generator.

In spite of these and other methods, there is a long felt need at the present time for a process to remove hexavalent chromium from an aqueous solution of alkali metal chlorate by the selective reduction of the hexavalent chromium, without reduction of alkali metal chlorate, at a pH value which results in the separation of chromium compounds as for example an insoluble trivalent chromium hydroxide, which can easily be removed from the aqueous alkali metal chlorate solution.

OBJECTS

It is a primary object of this invention to remove hexavalent chromium from concentrated aqueous solutions of alkali metal chlorates.

It is another object of this invention to remove hexavalent chromium from aqueous solutions of concentrated alkali metal chlorates by the selective reduction of hexavalent chromium, without reduction of alkali metal chlorate.

It is yet another object of this invention to remove hexavalent chromium from concentrated aqueous solutions of alkali metal chlorate solution without the introduction of significant amounts of impurities resulting from the reducing agent employed or reaction products thereof.

It is still another object of this invention to remove hexavalent chromium from aqueous solutions of concentrated alkali metal chlorates without significantly altering the ratio of alkali metal chlorate to alkali metal chloride in the solution.

BRIEF DESCRIPTION OF THE INVENTION

It has now been discovered that the foregoing objects are accomplished in a process for removing hexavalent chromium from an impure aqueous alkali metal chlorate solution containing them and which comprises reacting a hydrazine compound with the aqueous solution to form a slurry of solid particles of trivalent chromium compound in a solution and separating the solid particles of trivalent chromium compound from the solution.

DETAILED DESCRIPTION OF THE INVENTION

Any aqueous solution of alkali metal chlorate which contains reducible hexavalent chromium ions may be treated according to the process of this invention. Typical solutions are alkali metal chlorate solutions and alkaline earth metal chlorate solutions.

Typical alkali metal chlorates include sodium chlorate, potassium chlorate, lithium chlorate, rubidium chlorate, cesium chlorate and mixtures thereof.

Typical alkaline earth metal chlorates include beryllium chlorate, magnesium chlorate, calcium chlorate, strontium chlorate, barium chlorate, radium chlorate and mixtures thereof.

To simplify the description, the invention will be described in terms of a sodium chlorate solution although those of skill in the art will recognize that any other alkali metal chlorate or alkaline earth metal chlorate may be substituted with equivalent results. For example, one may substitute potassium chlorate, lithium chlorate, barium chlorate, mixtures thereof and the like.

The electrolytic production of sodium chlorate has been effected in electrochemical cells typically provided with steel cathodes. To avoid corrosion of the steel cathode and to improve the overall chlorate efficiency of the cell, hexavalent chromium compounds have been conventionally added to the cell liquor. The hexavalent chromium compound is usually added to the cell liquor in the form of sodium dichromate in an amount sufficient to provide a hexavalent chromate concentration in the range from about 0.1 to about 10.0 and preferably in the range from about 0.5 to about 5.0 grams sodium dichromate per liter of solution.

Hexavalent chromium may be added to a chlorate cell liquor in any suitable form. For example, soluble hexavalent chromium may be supplied as $Na_2CrO_4$ (sodium chromate), $Na_2Cr_2O_7$ (sodium dichromate), $CrO_3$ (chromic acid), potassium dichromate, potassium chromate, mixtures thereof and the like. Throughout this specification and claims, when reference is made to hexavalent chromium, it is to be understood that any source of soluble hexavalent chromium may be substituted with equivalent results.

In *Encyclopedia of Chemical Technology*, by Kirk-Othmer, Third Edition, Volume 5, pages 633-645, a variety of electrochemical cells are described for producing sodium chlorate. The teachings of that article are incorporated herein by reference.

A typical analysis of such a sodium chlorate liquor from a typical sodium chlorate cell plant is as follows:

| Component | Typical Analysis (grams per liter) | Min./Max. Analysis Narrow (grams per liter) | Min./Max. Analysis Broad (grams per liter) |
|---|---|---|---|
| NaClO₃ | 600 | 250-675 | 100-750 |
| NaCl | 150 | 100-300 | 20-400 |
| NaOCl | 1 | 0.2-4 | 0.1-5 |
| Hexavalent Chromium | 1 | 0.2-10 | 0.1-20 |

Those of skill in the art will recognize that greater or lesser concentrations of the components shown above may be present in sodium chlorate liquor. In addition, other minor components may also be present.

Additionally, as indicated in the Kirk-Othmer article cited above, one will recognize that the presence of alkali metal hypohalites such as sodium hypochlorite, potassium hypochlorite, mixtures thereof and the like is not a strict requirement of this invention but will recognize that such alkali metal hypohalites are expected components in a typical electrochemical cell plant producing alkali metal chlorates such as sodium chlorate.

The pH of typical sodium chlorate liquor is in the range from about 1 to about 12 and preferably in the range from about 2 to about 10.

Typical hydrazine compounds which may be employed in the process of this invention include hydrazine compounds of the formula,

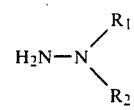

where $R_1$ and $R_2$ are each selected from a group consisting of hydrogen, straight chained alkyl groups, branched alkyl groups, hydroxy substituted straight chained alkyl groups, hydroxy substituted branched alkyl groups, aryl groups, hydroxy substituted aryl groups, and having in the range from 1 to about 20, and preferably from about 1 to about 6 carbon atoms per each alkyl or aryl group.

Other hydrazine groups which may be employed in the process of this invention include hydrazine compounds of the formula,

where $R_1$ and $R_2$ are as defined above.

Suitable examples of (a) monoalkyl hydrazines include methyl hydrazine, ethyl hydrazine, 2-hydroxyethyl hydrazine, 2-aminoethyl hydrazine, propyl hydrazine, butyl hydrazine, pentyl hydrazine, hexyl hydrazine, heptyl hydrazine, octyl hydrazine, nonyl hydrazine, decyl hydrazine, and mixtures thereof.

Typical examples of (b) dialkyl hydrazine compounds include 1,1-dimethyl hydrazine, 1,2-dimethyl hydrazine, 1-ethyl-2-methyl hydrazine, 1-ethyl-1-methyl hydrazine, 1,1-diethyl hydrazine, 1,2-diethyl hydrazine, 1-ethyl-2-propyl hydrazine, 1-ethyl-1-isopropyl hydrazine, 1,1-dipropyl hydrazine, 1,2-dipropyl hydrazine, 1,1-diisopropyl hydrazine, 1,2-diisopropyl hydrazine, 1-sec-butyl-1-ethyl hydrazine, 1-butyl-1-methyl hydrazine, 1,1-dibutyl hydrazine, 1,2-dibutyl hydrazine, 1-1-diamyl hydrazine, 1,2-diamyl hydrazine, 1-t-butyl-1-ethyl hydrazine, 1-1-di-t-butyl hydrazine, 1,1-dipentyl hydrazine, 1,2-dipentyl hydrazine, 1,1-dihexyl hydrazine, 1,2-dihexyl hydrazine, 1,2-bis(2-ethylhexyl) hydrazine, 1-ethyl-1-heptyl hydrazine, 1,1-diheptyl hydrazine, 1,2-diheptyl hydrazine, 1,1-dioctyl hydrazine, 1-(2-aminoethyl)-1-methyl hydrazine, 1,1-bis(2-aminoethyl) hydrazine, mixtures thereof and the like.

In addition, salts such as phosphates or sulfates of the above organic hydrazine compounds may be employed such as methyl hydrazine phosphate, methyl hydrazine sulfate, ethyl hydrazine phosphate, ethyl hydrazine sulfate, propyl hydrazine phosphate, propyl hydrazine sulfate, butyl hydrazine phosphate, butyl hydrazine sulfate, 1,1-dimethyl hydrazine phosphate, 1,1-dimethyl hydrazine sulfate, 1,1-dibutyl hydrazine, phosphate, 1,1-dibutyl hydrazine sulfate, mixtures thereof and the like.

Inorganic salts of hydrazine which may be employed in the process of this invention include monohydrazine phosphate, dihydrazine phosphate, trihydrazine phosphate, hydrazine monohydrochloride, hydrazine dihydrochloride, hydrazine monohydrobromide, hydrazine dihydrobromide, monohydrazine sulfate, dihydrazine sulfate, hydrazine sulfite, mixtures thereof and the like.

The hydrazine compound is reacted with the impure aqueous solution of sodium chlorate containing hexavalent chromium to form an aqueous slurry of solid particles of trivalent chromium compound in an aqueous solution of sodium chlorate, sodium chloride and a nitrogen containing compound. When hydrazine is reacted with the impure aqueous sodium chlorate solution, nitrogen gas forms, which is collected or otherwise disposed of.

Sufficient hydrazine compound is added to the impure aqueous solution to provide a molar ratio of hydrazine compound to hexavalent chromium in the aqueous solution in the range from about 0.75:1 to about 8:1, and preferably in the range from about 1:1 to about 4:1.

The hydrazine compound also reacts with any alkali metal hypohalite present such as alkali metal hypochlorite to remove alkali metal hypochlorite by chemical reaction.

Without being bound by theory, it is believed that hydrazine reacts with sodium hypochlorite to form sodium chloride, nitrogen, and water according to equation (1):

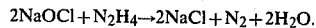

$$2NaOCl + N_2H_4 \rightarrow 2NaCl + N_2 + 2H_2O.$$

Additional hydrazine compound must be added to the impure aqueous solution to provide a molar ratio of additional hydrazine compound to alkali metal hypohalite in the aqueous solution in the range from about 0.4:1 to about 1:1 and preferably in the range from about 0.5:1 to about 0.6:1.

It has been found that the formation of and subsequent removal of the trivalent chromium compound such as $Cr(OH)_3$ is remarkably enhanced when the pH of the resultant solution, after hydrazine addition to the aqueous sodium chlorate solution is in the range from about 6.0 to about 7.5 and preferably in the range from about 6.5 to about 7.0. Selection of a suitable hydrazine compound will generally result in precipitation of trivalent chromium compound and simultaneous pH adjustment in the desired range.

No addition of inorganic acid may be required to adjust the pH of the resultant solution when an inorganic salt of hydrazine is employed as the hydrazine compound in the process of this invention.

In one embodiment, when the pH of the resultant solution is greater than about 7.5., sufficient inorganic acid is added to adjust the pH to within the range from about 6.0 to about 7.5 and preferably in the range from about 6.5 to about 7.0. If desired, the inorganic acid may be added to the impure aqueous solution before the hydrazine compound is admixed therewith to form the resultant solution.

Any inorganic acid may be employed in the process of this invention which is capable of controlling the pH of the resultant solution in the range from about 6.0 to about 7.5 and which does not act as a reducing agent for the alkali metal chlorate and hexavalent chromium present in the solution.

Typical inorganic acids include acids such as hydrochloric acid, sulfuric acid, phosphoric acid, nitric acid, ortho-phosphoric acid, pyrophosphoric acid, mixtures thereof and the like.

The inorganic acid is typically an aqueous solution of the inorganic acid having a concentration in the range from about 5 to about 75 and preferably in the range from about 10 to about 60 percent inorganic acid by weight.

In another embodiment, when the pH of the resultant solution is less than about 6, sufficient inorganic base is added to adjust the pH to within the range from about 6.0 to about 7.5 and preferably in the range from about 6.5 to about 7.0. If desired, the inorganic base may be admixed with the impure aqueous solution before the hydrazine compound is admixed with the impure aqueous solution to form the resultant solution.

Typical inorganic bases include aqueous solutions of sodium hydroxide, potassium hydroxide, mixtures thereof and the like. The particular inorganic base chosen is one that corresponds to the particular alkali metal chlorate solution undergoing chromate removal. For example, when treating a sodium chlorate solution, then it is preferred to employ sodium hydroxide as the inorganic base.

The inorganic base is typically an aqueous solution of the inorganic base having a concentration in the range from about 5 to about 75 and preferably in the range from about 10 to about 60 percent inorganic base by weight.

Inorganic solutions of buffers may also be employed to adjust the pH when the pH of the resultant solution is above about 7.5. For example, a typical buffer includes sodium acetate/acetic acid and sodium bicarbonate.

The solid particles of trivalent chromium compound, $Cr(OH)_3$, are separated from the liquid by any suitable solid-liquid separation technique, such as by settling, filtering, centrifuging, and the like. Filtration is the preferred form of solid-liquid separation, and the invention will be described using filtration as the solid-liquid separation technique. One skilled in the art will recognize that any other suitable solid-liquid separation technique may be employed.

The solid particles of trivalent chromium compound, after separation from the liquid, may be washed if desired, and then oxidized to the hexavalent state for use in electrolytic sodium chlorate cells or otherwise disposed of.

The clarified liquid is an aqueous solution of sodium chlorate and sodium chloride which is substantially free of chromium ions. The purified solution is useful as feed for chlorine dioxide generators since the weight ratio of alkali metal chlorate, such as sodium chlorate, to alkali metal chloride, such as sodium chloride, remains substantially the same throughout the process of this invention.

The temperature of the impure aqueous sodium chlorate solution during reaction with the hydrazine compound is in the range from about 0° to about 150° C. and preferably in the range from about 20° to about 120° C. The reaction is generally carried out at atmospheric pressure but super- or subatmospheric pressure may be employed if desired.

Either a batch or a continuous operation can be used, although the continuous system is preferable.

The process of this invention avoids the above-mentioned disadvantages by providing separation of hexavalent chromium from the aqueous alkali metal chlorate solution without the addition of any impurity to the solution.

The following examples are presented to define the invention more fully without any intention of being limited thereby. All parts and percentages are by weight unless indicated otherwise.

EXAMPLE 1

In this example, hexavalent chromium was substantially removed from a concentrated aqueous sodium chlorate solution.

A concentrated aqueous solution of sodium chlorate containing about 600 grams sodium chlorate per liter, about 100 grams sodium chloride per liter, and about 0.5 grams sodium dichromate ($Na_2Cr_2O_7.2H_2O$) per liter was prepared. The initial pH of the aqueous sodium chlorate solution was about 4. The weight ratio of sodium chlorate to sodium chloride was calculated to be about 6:1. The initial temperature of the aqueous sodium chlorate solution was maintained at about 25° C. in this example.

Sufficient dilute (about 20% strength) aqueous sodium hydroxide solution was added to about 50 milliliters of the sodium chlorate solution to adjust the pH to about 5.

About 0.15 milliliter of about a 35 weight percent aqueous solution of hydrazine was added to the 50-milliliter portion of the aqueous sodium chlorate solution. The amount of $N_2H_4$ added was about the stoichiometric quantity required to react with the sodium dichromate originally present. The pH of the resultant solution increased to about 7.9. Little or no reaction was noted.

A sufficient amount of a dilute aqueous solution of phosphoric acid was admixed with the aqueous sodium chlorate solution to decrease the pH slightly below about 7. An immediate reaction occurred in the resultant solution as indicated by the resultant solution turning color from yellow to blue-green, coincident with the formation of a precipitate. After about 16 hours, a small amount of $NaClO_3$ had also crystallized and settled due to inadvertant cooling of the resultant solution. The $NaClO_3$ was redissolved by heating the resultant solution to about 85° C. for about 20 minutes.

The heated solution was then filtered through a fine mesh fritted glass filter using an aspirator forming a filter cake of solid particles of insoluble trivalent chromium compound and a filtrate.

The solid particles retained on the filter were washed with about 25 milliliters hot water. The filtrate thereby obtained was clear. The solid particles retained on the filter were rinsed with a small portion of concentrated hydrochloric acid and all of the rinsings and filtrate were added to volumetric flask and further diluted with hydrochloric acid.

The concentration of hexavalent chromium in the filtrate was determined to be about 0.07 part chromium per million by weight by employing a Hach kit spectrophotometer using diphenyl carbazide, a reagent specific for hexavalent chromium. This analysis indicated nearly complete hexavalent chromium removal from the concentrated aqueous solution of sodium chlorate. Analysis of the solution of filter cake trivalent chromium compound indicates recovery of about 86 percent of the chromium originally present in the chlorate solution.

EXAMPLE 2

In this example, the same procedure was employed as in Example 1 except that about 0.20 milliliter of $[N_2H_5]_{1.5}H_{1.5}PO_4$ solution (equivalent to about 50 milligrams as $N_2H_4$) was admixed with about 50 milliliters of the concentrated sodium chlorate solution having a pH of about 5. The pH of the final solution was about 6.1. The color of the solution turned from yellow to blue-green in about one to two minutes, coincident with the formation of a precipitate.

The concentration of hexavalent chromium in the filtrate was determined to be about 0.09 part hexavalent chromium per million by weight. This indicated nearly complete hexavalent chromium removal.

COMPARATIVE TEST A

In this comparative test, the same concentrated aqueous sodium chlorate solution was employed as in Examples 1 and 2, except that sufficient dilute sodium hydroxide was admixed with the aqueous sodium chlorate solution having an initial pH of about 4 to raise the pH to a final pH of about 6.5. About 0.14 milliliter of a 35 weight percent aqueous $N_2H_4$ solution was admixed with about 50 milliliters of the concentrated aqueous sodium chlorate solution. The pH of the resultant solution increased to substantially above about 7.5. There was no color change of the solution and no formation of a precipitate.

COMPARATIVE TEST B

The same procedure was employed in this example to Comparative Test A, except that about 0.28 milliliter of a 35 weight percent aqueous $N_2H_4$ solution was admixed with about 50 milliliters of the concentrated aqueous sodium chlorate solution. The pH of the resultant solution increased to substantially above about 7.5. There was no color change of the solution and no formation of a precipitate.

COMPARATIVE TEST C

The same procedure was employed in this example to Comparative Test B, except that about 0.55 milliliter of a 35 weight percent aqueous $N_2H_4$ solution was admixed with about 50 milliliters of the concentrated aqueous sodium chlorate solution. The pH of the resultant solution increased to substantially above about 7.5. There was no color change of the solution and no formation of a precipitate.

EXAMPLE 3

In this example, sodium hypochlorite was substantially and selectively reacted in a concentrated aqueous sodium chlorate solution.

A concentrated aqueous solution of sodium chlorate was prepared containing about 500 grams sodium chlorate per liter, about 70 grams sodium chloride per liter, about 1.5 grams sodium dichromate per liter and about 0.8 gram sodium hypochlorite per liter. The pH of the solution was basic, about 8.4 (due to the presence of sodium hydroxide which was chlorinated to produce the sodium hypochlorite).

About 50 milliliters of the above solution was admixed with about 0.03 gram of about a 33 weight percent aqueous $N_2H_4$ solution. The pH of the resulting solution was about 7.3.

After about five minutes, the solution was titrated for sodium hypochlorite remaining which was determined to be about 0.09 gram NaOCl per liter remaining.

About 89 percent by weight of the sodium hypochlorite present initially was selectively consumed by the addition of about the stoichiometric amount of $N_2H_4$ to react with the sodium hypochlorite.

EXAMPLE 4

The same procedure was employed as in Example 3 except that about 0.036 gram $N_2H_4.H_2SO_4$ was admixed with about 50 milliliters of the concentrated sodium chlorate solution of Example 3. About 0.076 gram NaOCl remained after about five minutes indicating about 91 percent of the NaOCl present initially had been consumed by adding about the stoichiometric amount of $N_2H_4.H_2SO_4$ to react with the sodium hypochlorite. Example 4 indicates that the hydrazine compound reacts preferentially with the sodium hypochlorite, rather than with the sodium dichromate or the sodium chlorate.

EXAMPLE 5

In this example, the pH of about 50 milliliters of the solution of Example 3 was adjusted to about 7 by the addition of sodium acetate/acetic acid buffer and sodium bicarbonate. About 0.07 gram of about 33 weight percent $N_2H_4$ aqueous solution was admixed therewith to form a resultant solution. The amount of $N_2H_4$ added corresponded to about the stoichiometric amount of $N_2H_4$ added to react with both NaOCl and sodium dichromate. After addition of the $N_2H_4$, the pH of the resultant solution was about 7.2. The solution showed a light green tint to the otherwise yellow solution indicating some sodium dichromate reduction. A clouding of the resultant solution was noted.

Potassium iodide was used to test for sodium hypochlorite. No color change occurred indicating the absence of sodium hypochlorite.

The solution was acidified and titrated for sodium dichromate. About 29 percent of the sodium dichromate present in the original solution had been consumed.

What is claimed is:

1. A process for removing hexavalent chromium from an impure aqueous solution which comprises:
   (a) reacting a hydrazine compound with said impure aqueous solution, said impure aqueous solution containing from about 100 to about 750 grams of alkali metal chlorate per liter and from about 20 to about 400 grams of alkali metal chloride per liter, said reaction being carried out at a pH in the range from about 6.0 to about 7.5 to form an aqueous slurry of solid particles of trivalent chromium compound in an aqueous solution of alkali metal chlorate, alkali metal chloride, and a nitrogen-containing compound; and
   (b) separating said solid particles of trivalent chromium compound from said aqueous solution; and wherein said hydrazine compound selectively reduces hexavalent chromium to trivalent chromium to achieve hexavalent chromium removal without reducing said alkali metal chlorate or said alkali metal chloride.

2. The process of claim 1, wherein the hydrazine compound is of the formula,

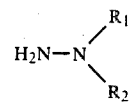

where $R_1$ and $R_2$ are each selected from a group consisting of hydrogen, straight chained alkyl groups, branched alkyl groups, hydroxy substituted straight chained alkyl groups, aryl groups, hydroxy substituted aryl groups and having in the range from 1 to about 20 carbon atoms per alkyl or aryl group.

3. The process of claim 1, wherein the hydrazine compound is of the formula,

where $R_1$ and $R_2$ are each selected from a group consisting of hydrogen, straight chained alkyl groups, branched alkyl groups, hydroxy substituted straight chained alkyl groups, hydroxy substituted aryl groups, and having in the range from about 1 to about 20 carbon atoms per alkyl or aryl group.

4. The process of claims 2 or 3, wherein $R_1$ and $R_2$ have in the range from about 1 to about 6 carbon atoms per alkyl or aryl group.

5. The process of claim 1, wherein said hydrazine compound is hydrazine.

6. The process of claim 5, wherein said alkali metal chlorate is sodium chlorate.

7. The process of claim 6, wherein said hexavalent chromium is present in said impure aqueous solution as sodium dichromate.

8. The process of claim 7, wherein said hydrazine is added in a proportion sufficient to provide a molar ratio of said hydrazine to said hexavalent chromium is in the range from about 0.75:1 to about 8:1.

9. The process of claim 8, wherein an inorganic acid is admixed with said resultant solution to adjust the pH of said resultant solution.

10. The process of claim 8, wherein an inorganic base is admixed with said resultant solution to adjust the pH of said resultant solution.

11. The process of claim 9, wherein said inorganic acid is phosphoric acid.

12. The process of claim 10, wherein said inorganic base is sodium hydroxide.

13. The process of claim 1, wherein said impure aqueous solution further contains from about 0.1 to about 5 grams of alkali metal hypohalite per liter; and wherein an additional amount of said hydrazine compound is added to said impure aqueous solution to reduce said alkali metal hypohalite to an alkali metal chloride compound.

14. The process of claim 1, wherein said hydrazine compound is an inorganic hydrazine salt.

15. The process of claim 13, wherein said hydrazine compound is hydrazine.

16. The process of claim 15, wherein said alkali metal chlorate is sodium chlorate.

17. The process of claim 15, wherein said alkali metal chlorate is sodium chlorate and said alkali metal chloride is sodium chloride.

18. The process of claim 17, wherein said solid particles of trivalent chromium compound, after separation from the aqueous solution, are washed and then oxidized to the hexavalent state for use in electrolytic sodium chlorate cells.

* * * * *